T. E. MURRAY, Jr., AND J. B. MURRAY.
METHOD OF ELECTRICAL WELDING.
APPLICATION FILED DEC. 24, 1919.
1,339,969. Patented May 11, 1920.
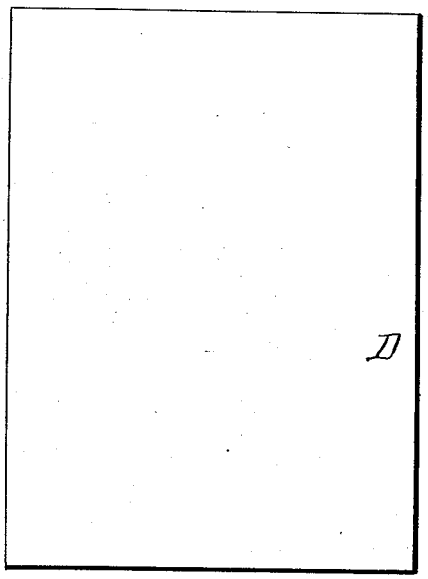
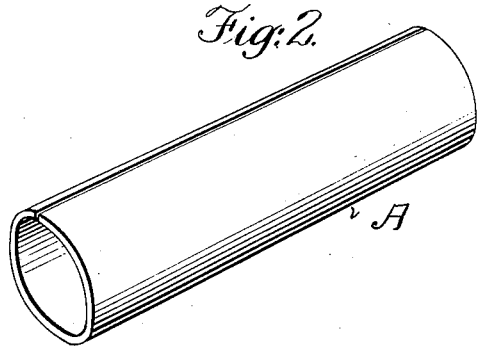
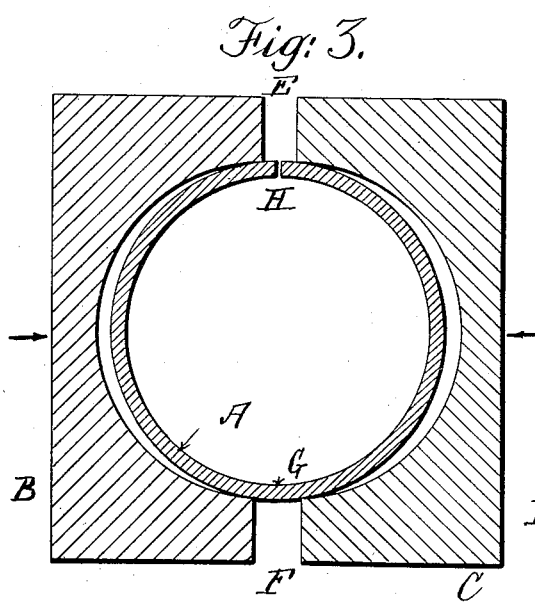
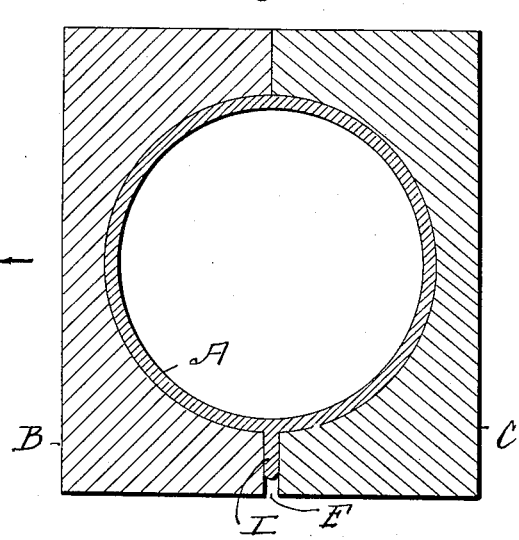

UNITED STATES PATENT OFFICE.

THOMAS E. MURRAY, JR., AND JOSEPH B. MURRAY, OF BROOKLYN, NEW YORK.

METHOD OF ELECTRICAL WELDING.

1,339,969.  Specification of Letters Patent.  Patented May 11, 1920.

Application filed December 24, 1919. Serial No. 347,213.

*To all whom it may concern:*

Be it known that we, THOMAS E. MURRAY, Jr., and JOSEPH B. MURRAY, citizens of the United States, residing at Brooklyn, in the county of Kings and State of New York, have invented a certain new and useful Improvement in Methods of Electrical Welding, of which the following is a specification.

In order to weld together electrically the edges of a tube produced by bending or rolling a sheet of metal in cylindrical form, the usual practice is to clamp the wall of the tube near one edge between a pair of electrodes of one polarity, and to clamp the wall of the tube near the opposite edge between electrodes of the opposite polarity, so that the current passes across the joint from one pair of clamping electrodes to the other pair. As one member of each pair of clamps is within the tube and the other members outside, the arrangement of said clamps is difficult, especially when the tube is of small diameter, and there is always danger of burning the metal at the joints between itself and the clamps. It has been deemed impracticable to weld the edges of the tube together by simply seating the tube in recesses in two electrodes and moving them together to bring said edges into contact, the current meanwhile passing, because of the short-circuiting of said current through the portion of the tube wall which bridges the gap between the opposing faces of the electrodes, which gap lies opposite to the gap into which the edges of the tube protrude. By our hereinafter described method, we eliminate the short-circuiting difficulty, and permit the edges to be united while the same are seated in two recessed electrodes, as above described, and this without regard to the smallness—within reasonable limits—of the tube's diameter.

In the accompanying drawing—

Figure 1 is a flat sheet of metal. Fig. 2 shows in perspective said sheet bent into tubular form, with its edges not united. Fig. 3 is a cross section of said tube seated in the electrodes before the joint between said edges is made. Fig. 4 is a similar view, showing said joint completed.

Similar letters of reference indicate like parts.

A is the tube, seated in recesses in the electrodes B, C. Said tube is formed by bending or rolling a sheet of metal D, Fig. 1, into cylindrical form, as shown in Fig. 2. Between the electrodes are gaps E and F. The wall of the tube at G bridges the gap F, and the edges of the tube which are to be welded extend into the gap E. The electrodes are to be relatively movable to approximate more nearly the opposing faces of the electrodes B, C, and so to narrow said gaps.

When the heating current is established and the electrodes are pressed together to reduce the width of said gaps E, F simultaneously, a part of said current passes through the joint at H, and a part through the wall portion G which bridges gap F.

We have found that any material short-circuiting of the current at the joint H through portion G can be prevented by increasing the resistance at gap F. This we do by increasing the width of said gap F, and thus increasing the length of the portion G. As the heating of portion G increases, the resistance there offered to the passage of the current is augmented, and as the lengthening of said portion still further increases said resistance, it is obvious that by suitably proportioning the width of gap F, and hence the length of portion G, we can thus increase the proportional amount of current traversing the joint, so that its strength may there be kept at a predetermined degree sufficient to effect the welding. The metal I extruded at gap F may be cut off or left as a strengthening flange.

We claim:

The method of electrically welding the longitudinal edges of a tube formed by bending a metal sheet, which consists in seating said tube in recesses in opposing relatively movable electrodes so that the edges to be welded shall enter one of the two gaps between the faces of said electrodes, proportioning the width of the other of said two gaps to vary the resistance offered by the metal of said tube bridging said gap to maintain at predetermined strength the welding current at the joint, and pressing said electrodes together until said edges are united.

In testimony whereof we have affixed our signatures in presence of two witnesses.

THOMAS E. MURRAY, JR.
JOSEPH B. MURRAY.

Witnesses:
GERTRUDE T. PORTER,
MAY T. MCGARRY.